July 16, 1957 K. SHORT 2,799,732

MAGNETIC RECORDING APPARATUS

Filed Nov. 24, 1953

INVENTOR;
Konrad SHORT
by [signature]
Attorney

United States Patent Office 2,799,732

Patented July 16, 1957

2,799,732

MAGNETIC RECORDING APPARATUS

Konrad Short, Wembley, England, assignor to Truvox Limited, Wembley, England, a British company Application November 24, 1953, Serial No. 394,116

Claims priority, application Great Britain November 27, 1952

5 Claims. (Cl. 179—100.2)

This invention relates to electro-magnetic recording apparatus and is more particularly concerned with the construction of recording, reproducing or erasing heads (hereinafter called a head device) for use with magnetic recording tape or wire, for instance, the now well known plastic tape coated or impregnated with ferromagnetic material.

In the usual form of head device it is customary to provide a magnetic flux path of generally annular shape and including a narrow radial flux gap for location in close proximity to the recording medium. This magnetic flux path is usually provided by two stacks of C-shaped laminations of ferromagnetic material placed ends to ends in opposed relationship and with a thin strip of non-magnetic material, e. g. brass foil inserted between one pair of opposing ends to define the operative magnetic flux gap. Such stacks of laminations are held clamped in position by pressure directed axially on the annular shaped assembly as by two screws or bolts between clamping plates disposed one against each of the end surfaces of the stacks.

Such an arrangement is disadvantageous in that there is no effective clamping pressure acting to maintain the operative magnetic flux gap between the separated opposed ends of the laminations at the minimum value set by the inserted non-magnetic spacing material. The clamping pressure merely tends to maintain the stacks of laminations in whatever position they are initially placed prior to application of the clamping pressure. In consequence it is necessary to provide a separate moderate value gap-closing pressure upon the stacks during clamping while there may be a tendency in time for the flux gap to widen or alter in shape due to displacement of the laminations or some of them. A further disadvantage resides in the restriction imposed by the presence of such end clamping plates upon the amount of space which is available for accommodating the requisite electrical windings which must encircle one or both of the stacks of laminations.

The object of the present invention is to provide an improved construction which reduces or avoids the above difficulties and in accordance therewith the magnetic path defining elements, e. g. stacks of C-shaped laminations are disposed within an embracing member of non-magnetic material which is constructed so as to be capable of being contracted and thereby to exert a clamping action upon the aforesaid magnetic flux path elements, in a direction which, in the region of the flux gap is substantially normal to the plane of such gap so as to maintain such flux gap at the value determined by the inserted non-magnetic spacing material. If desired axial clamping pressure upon flux path elements which are constituted by lamination stacks may also be provided but this is preferably restricted to an area of limited extent lying immediately adjacent to the operative magnetic flux gap.

The removal of the end clamping plates or the major part thereof permits relatively free access to the mid-regions of the C-shaped laminations or other magnetic elements and in consequence permits the use of a larger size coil winding with any given size of magnetic elements with resultant reduction of manufacturing skill and cost due to the permitted use of a larger gauge wire for the winding. Alternatively a winding of higher impedance can more readily be provided with a given size of magnetic elements.

In order that the nature of the invention may be more readily understood one particular and preferred embodiment will now be particularly described by way of illustrative example with reference to the accompanying drawing in which:

Figure 6 is a plan view of one stack of C-shaped laminations with its associated energising winding while

Figure 1:
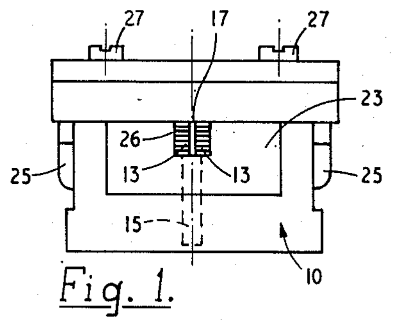
Figure 1 is a side elevation.
Figure 2:
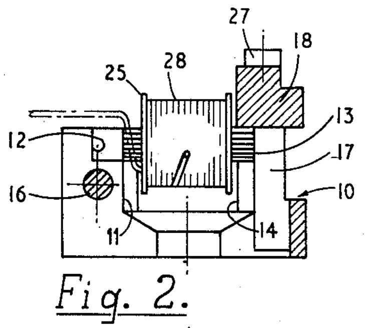
Figure 2 is a diametral cross-section on line II—II of Fig. 3
Figure 3:
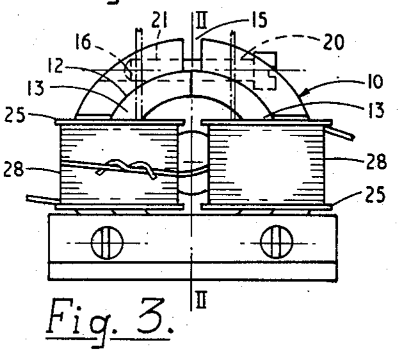
Figure 3 is a plan view of a head device according to the invention.

Referring now to the drawings, the embodiment shown comprises two mutually opposed stacks 13 of C-shaped laminations of sheet ferromagnetic material disposed within an embracing member 10 which is in the form of a brass ring which is slotted radially at one point as shown at 15 and provided with a clamping screw 16 passing from one of the ring ends to the other so as to permit such divided ends to be drawn together.

Figure 4:
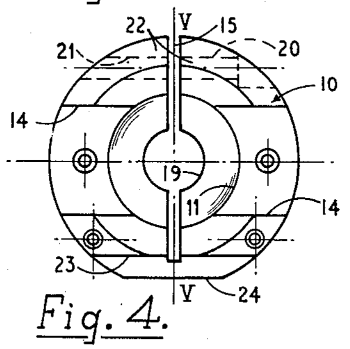
Figure 4 is a plan view and Figure 5 a diametral cross-section on the line V—V of Fig. 4 of the non-magnetic embracing member.
Figure 5:
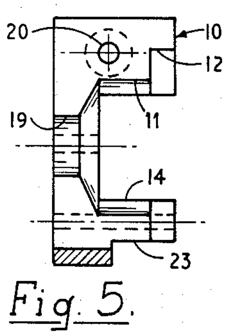

As shown more particularly in Figs. 4 and 5, the aforesaid brass ring consists of a short length (about 0.5 inch) of brass rod (about 1 inch diameter) which is first bored through axially with a small diameter (about 0.25 inch) hole 19 and then counterbored, as indicated at 11, to a larger diameter (about 0.5 inch) for a major portion (about 0.3 inch) of its length from one end face only. The outer end of this counterbore is then further enlarged by a further counterbore as shown at 12 to a diameter equal to that of the external diameter of the assembled stacks of C-shaped laminations (about 0.76 inch) for an axial depth equal to that of the stack height (say 0.1–0.11 inch) to form an annular recess capable of snugly accommodating the lamination stacks. A rectangular section channel 14, of a width (about 0.385 inch) sufficient to accommodate the length of the winding required on each lamination stack and of a depth (about 0.3 inch) sufficient to accommodate the projection of the windings beyond the inner face of the laminations when in said annular recess 12, is next cut diametrically across the counterbored end of the rod followed by the formation of the radially directed slot 15 throughout the whole length of the rod from one peripheral point nearly to the diametrically opposite peripheral point. This slot 15, whose plane lies at right angles to the direction of the cross channel 14, provides a degree of contractibility to the ring. A clearance hole 20 and a tapped hole 21 in the opposing ends 22 of the split ring and disposed normal to the slot 15 at a point near to the outermost end of the latter serves to accommodate a clamping screw 16 which, when suitably tightened operates to draw the divided end parts 22 closer together and thus to reduce the internal diameter of the lamination receiving recess 12. On the peripheral side directly opposite the slot 15 and in a plane parallel with the ring axis, and also with the axis of the cross channel 14, the metal of the ring 10 is removed to form a flat 23 which breaks into and exposes the lamination recess 12. The width of this flat 23 is approximately equal to the depth of the counterbore 11 while the remaining part of the ring periphery may also be flattened, parallel with the first flat but to lesser extent as shown at 24.

Figure 6:
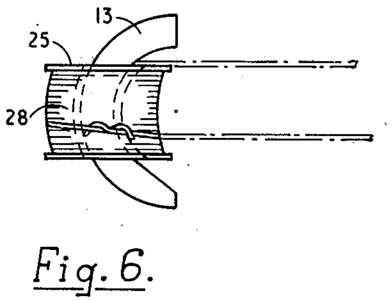
Figure 7:
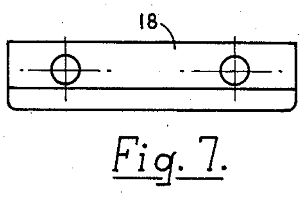
Figure 7 is a plan view of the clamping bar.

The assembled stacks of C-shaped laminations 13, each with a suitable encircling electric winding 28 carried upon a bobbin 25 (see more particularly, Fig. 6), are inserted into the lamination recess 12 with the magnetic flux gap which is defined by the non-magnetic insert 17 of thin sheet metal between one pair of opposing ends of the laminations, exposed through the opening 26 formed by the flat 23. By tightening the single clamping screw 16 the laminations 13 can now be gripped and continuously subjected to a gentle clamping pressure in a direction substantially normal to the plane of the flux gap and which tends to maintain the flux gap at its chosen value as set by the thickness of the inserted spacing member 17. If axial clamping of the laminations of each stack is also required this is provided by a short length of brass bar 18 (see Fig. 7) disposed parallel to the first described flat 23 and urged towards the counterbored end surface of the ring by two clamping screws 27 passing therethrough into the body of the ring 10. Such a clamp provides axial clamping pressure upon the laminations in the immediate vicinity of the operative flux-gap 17.

Various modifications are obviously possible without departing from the scope of the invention. For instance the encircling member may be formed of two completely separated sections interconnected by two clamping screws. Alternatively the clamping pressure may be applied by means of an external band which is capable of being contracted.

I claim:

1. An electromagnetic head structure for recording, reproducing or erasing electric signals on or from a magnetic recording medium comprising a ring-like body of non-magnetic material, said body having a radially directed slot therein disposed in an axial plane and extending for more than half the diameter of the ring inwardly from the external surface of the body to define two opposing ends, clamping means bridging the outer end of said slot for drawing said opposing ends towards each other, an axially directed circular recess in one end of said body, two stacks of substantially C-shaped laminations of ferromagnetic material, an electric winding encircling at least one of said stacks, said stacks being embedded in said recess in said solid ring-like body with their respective ends opposing the similar ends of the opposite stack and a thin strip of non-magnetic material inserted between at least one pair of said opposing ends to define an operative magnetic flux gap having its plane at right angles to the planes of the stack laminations, said opposing stack ends and said strip being held in clamped relationship by clamping pressure exerted by said clamping means operating on said opposing ends of said body, said operative magnetic flux gap being disposed on the side of said body opposite to that of said radial slot and a relieved region on the outer surface of said body opposite to said slot, said relieved region being of a dimension sufficient to expose the outermost end of said operative magnetic flux gap for co-operation with the magnetic recording medium.

2. An electromagnetic head structure for recording, reproducing or erasing electric signals on or from a magnetic recording medium comprising a ring-like body of non-magnetic material, said body having a radially directed slot therein disposed in an axial plane and extending throughout the axial length of the body inwardly for more than half the diameter of the ring from the external surface of the body to define a split ring having two opposing ends, clamping means bridging the outer end of said slot for drawing said opposing ends towards each other to contract the ring, an axially directed circular recess in one end of said body, two stacks of substantially C-shaped laminations of ferro-magnetic material, an electric winding encircling at least one of said stacks, said stacks being embedded in said recess in said solid ring-like body with their respective ends opposing the similar ends of the opposite stack and a thin strip of non-magnetic material inserted between each of said opposing ends to define operative magnetic flux gaps each having its plane at right angles to the planes of the stack laminations, said opposing stack ends and said strips being held in clamped relationship by clamping pressure exerted through said contractible ring by said clamping means operating on said opposing ends, one of said operative magnetic flux gaps being disposed on the side of said body opposite to that of said radial slot and a relieved region on the outer surface of said body opposite to said slot, said relieved region being of a radial depth dimension sufficient to expose the outermost end of said magnetic flux gap for co-operation with the magnetic recording medium.

3. An electromagnetic head structure for recording, reproducing or erasing electric signals on or from a magnetic recording tape comprising a ring-like body of non-magnetic material, said body having a radially directed slot therein disposed in an axial plane and extending throughout the axial length of the body inwardly for more than half the diameter of the ring from the external surface of the body to define a split ring having two opposing ends, a clamping screw bridging the outer end of said slot for drawing said opposing ends towards each other to contract the ring, an axially directed circular recess in one end of said body, two stacks of substantially C-shaped laminations of ferro-magnetic material, an electric winding encircling each of said stacks, said stacks with their respective windings being embedded in said recess in said solid ring-like body with their respective ends opposing the similar ends of the opposite stack and a thin strip of non-magnetic material inserted between each of said opposing ends to define operative magnetic flux gaps each having its plane at right angles to the planes of the stack laminations, said opposing stack ends and said strips being held in clamped relationship by clamping pressure exerted through said contractible ring by said clamping screw operating on said opposing ends of said body, one of said operative magnetic flux gaps being disposed on the side of said body diametrically opposite to that of said radial slot, a relieved region on the outer surface of said body diametrically opposite to said slot, said relieved region being of a radial depth dimension sufficient to expose the outermost end of the adjacent magnetic flux gap for co-operation with the magnetic recording tape and means for applying clamping pressure in an axial direction to the opposing ends of said lamination stacks which define the magnetic flux gap adjacent said relieved region.

4. An electromagnetic recording head structure comprising a solid ring-like body formed of a portion of non-magnetic metal rod, an axial bore through said rod, a counter-bore from one end face of said rod extending for a major portion of the length of the rod, a further counter-bore of larger diameter from the same end face extending for a minor portion of the length of the rod, a radially directed slot disposed in an axial plane extending from the outer surface of said rod to beyond the side wall of said further counter-bore on the diametrically opposite side of the rod, a channel in said end face directed diametrically across said end face at right angles to said slot, a pair of lamination stacks each comprising a plurality of substantially C-shaped laminations of ferromagnetic material, electric windings encircling each of said lamination stacks, said lamination stacks and the windings carried thereby being embedded in said further counter-bore with said windings accommodated in said channel and with the opposing ends of one of said lamination stacks opposing the similar ends of the opposite lamination stack, a thin sheet separator of non-magnetic material disposed between each of said pairs of opposing ends, clamping means extending across said slot near its outermost end for contracting said ring to clamp said laminations in face-to-face relationship with said non-magnetic separators disposed therebetween and a tangentially disposed relieved region on the outer surface of said ring-like body at the opposite side thereof to said slot for exposing one of said flux gaps.

5. An electromagnetic recording head structure comprising a solid ring-like body formed of a portion of non-magnetic metal rod, an axial bore through said rod, a counter-bore from one end face of said rod extending for a major portion of the length of the rod, a further counter-bore of larger diameter from the same end face extending for a minor portion of the length of the rod, a radially directed slot disposed in an axial plane extending from the outer surface of said rod to beyond the side wall of said further counter-bore on the diametrically opposite side of the rod, a channel in said end face directed diametrically across said end face at right angles to said slot, a pair of lamination stacks each comprising a plurality of substantially C-shaped laminations of ferromagnetic material, electric windings encircling each of said lamination stacks, said lamination stacks and the windings carried thereby being embedded in said further counter-bore with said windings accommodated in said channel and with the opposing ends of one of said lamination stacks opposing the similar ends of the opposite lamination stack, a thin sheet separator of non-magnetic material disposed between each of said pairs of opposing ends, a clamping screw extending across said slot near its outermost end for contracting said ring to clamp said laminations in face-to-face relationship with said non-magnetic separator disposed therebetween, a tangentially disposed relieved region on the outer surface of said ring-like body at the opposite side thereof to said slot for exposing one of said flux gaps and a clamping bar secured to said same end face of said rod adjacent said relieved region for exerting clamping pressure in an axial direction to the opposing ends of said lamination stacks which define said exposed flux gap.

References Cited in the file of this patent

UNITED STATES PATENTS

| | | |
|---|---|---|
| 2,561,365 | Hare | July 24, 1951 |
| 2,574,707 | Pettus | Nov. 13, 1951 |